Oct. 1, 1968    R. B. BRINDLEY    3,403,526
AUGER TYPE ICE MAKING MACHINE
Filed June 27, 1967    2 Sheets-Sheet 1

Inventor
Richard B. Brindley
Whiley, Whiley, House & Clemency
Attorneys.

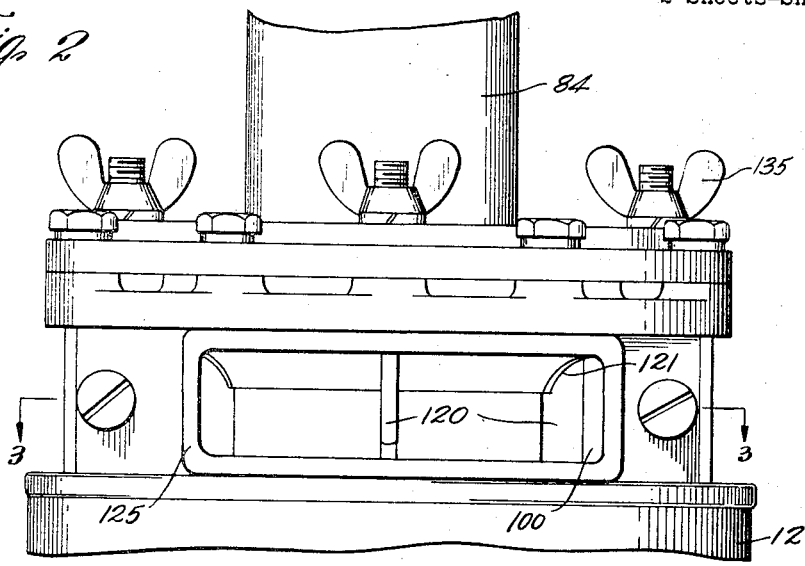
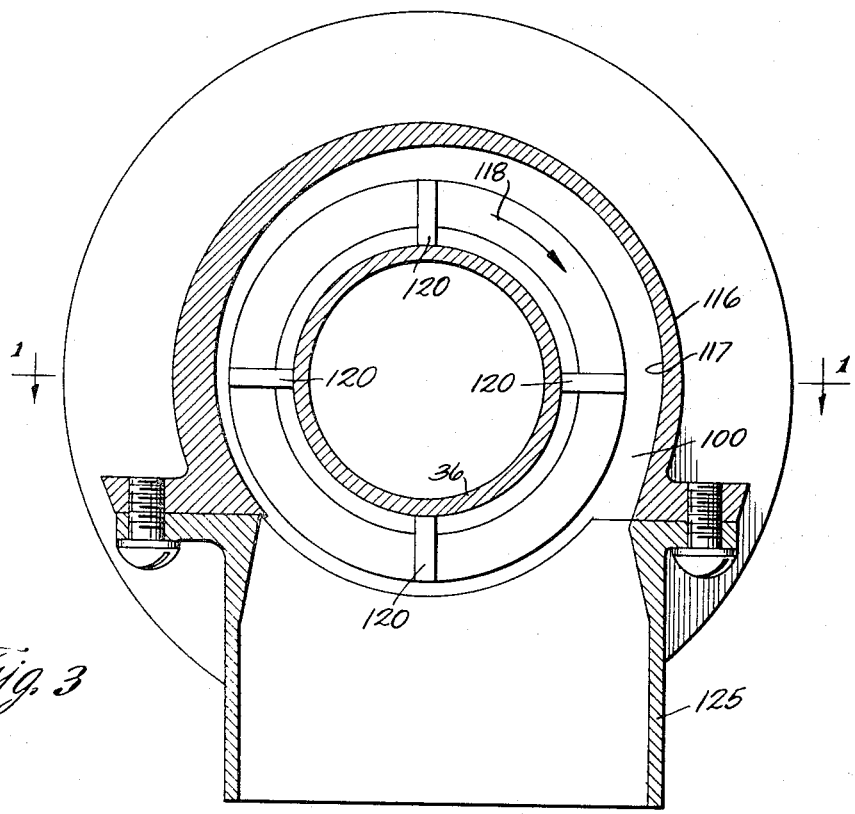

United States Patent Office 3,403,526
Patented Oct. 1, 1968

3,403,526
AUGER TYPE ICE MAKING MACHINE
Richard B. Brindley, La Crosse, Wis., assignor to La Crosse Cooler Company, La Crosse, Wis., a corporation of Wisconsin
Filed June 27, 1967, Ser. No. 649,285
5 Claims. (Cl. 62—188)

ABSTRACT OF THE DISCLOSURE

A tubular rotary screw operates in a freezing chamber having its tubular freezing wall encircled by an evaporator. A float which need not rotate is disposed within the screw to control the level of water introduced through the interior of the tubular screw from a valve controlled by the float. As water freezes in the chamber surrounding the screw, it is propelled by the screw and generally radial fins carried thereby through a throat having relatively fixed and rotatable wall portions and progressively enlarging in the direction of screw rotation.

The screw itself is operated by a gear train which drives the shaft to which the lower end of the screw is slidably coupled. Suitable bearings are provided for the shaft and the lower end of the screw with seals for confining the water to the freezing chamber and an arrangement for draining off any leakage. The bearings include a thrust bearing supporting the lower end of the screw. Its upper end is guided by a radial bearing.

Background of the invention

The instant application is a continuation-in-part of my application entitled "Ice Making Machine," Ser. No. 570,452 filed Aug. 5, 1966, and presently standing abandoned. Ice making machines of the type in which a screw operates in a tubular freezing chamber have long been known but have not included the features specifically recited in the foregoing abstract of disclosure.

Summary of the invention

The invention includes the screw open at its center and controlled as to temperature by make-up water admitted through it; the float operating in the screw to control water admission; the volute form of the ice removal throat and its relation to the fins on the screw; the housing for the drive gearing and the mounting of the screw and the freezing chamber and drainage of leakage; and the specific structure of the said chamber.

Brief description of the drawings

FIG. 2 is a fragmentary front elevational view of the upper portion of the apparatus.
FIG. 3 is a view taken in section on the line 3—3 of FIG. 2.

Detailed description

Figure 1:
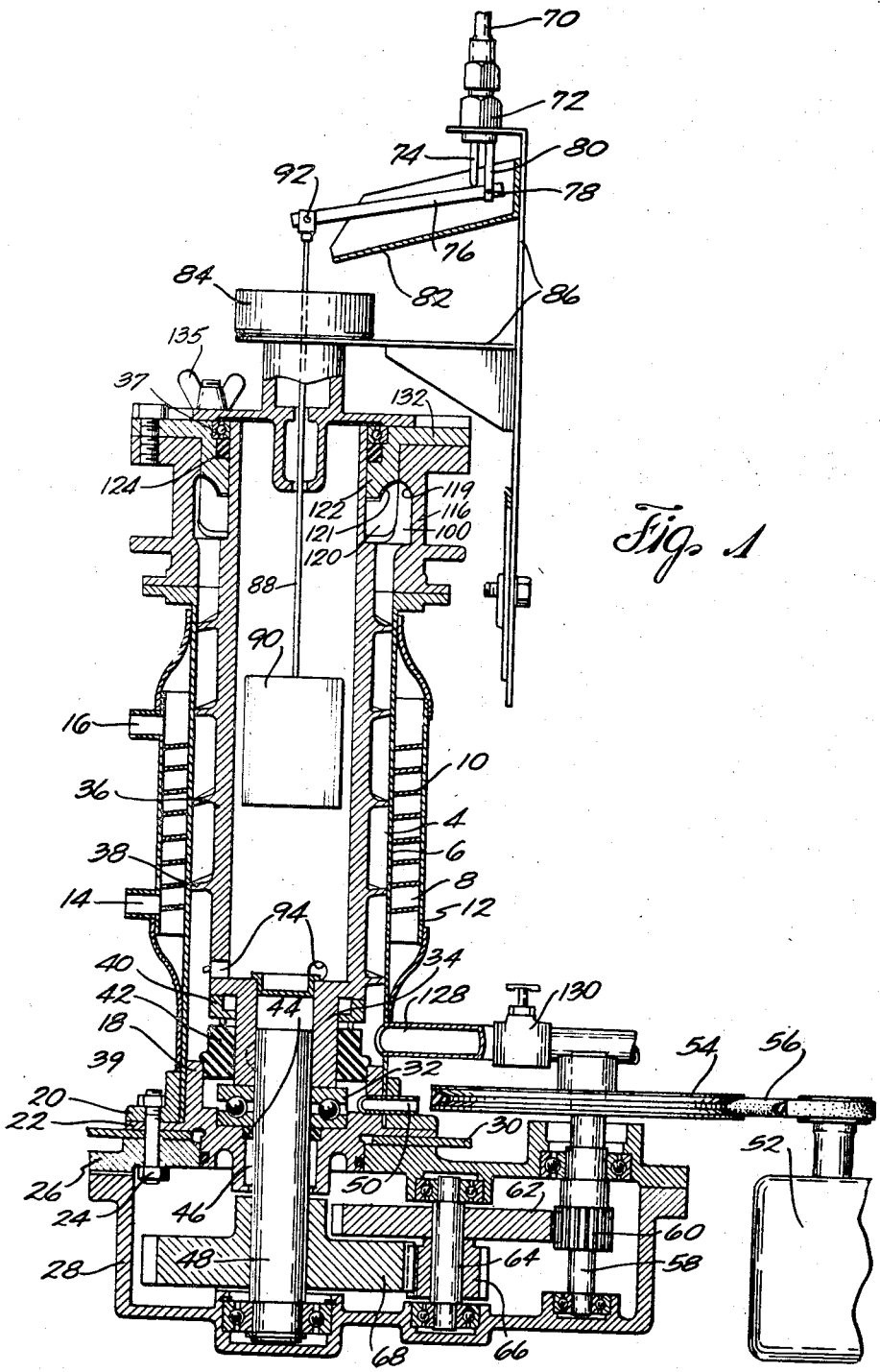
FIG. 1 is a view generally in axial section on the line 1—1 of FIG. 3 through a device embodying the invention.

A tubular freezing chamber 4 is formed by a sleeve 6 encircled by an evaporator 8. The coil 8 is made by a helical partition 10 between the sleeve 6 and an outer sleeve 12. An inlet is provided at 14 and an outlet at 16, it being understood that the liquid refrigerant will be supplied by a conventional compressor, the refrigerant being returned in gaseous form at the outlet 16.

Below the evaporator, the sleeve 6 is confined between an annular fitting 18 and a complementary collar 20 which seats on a flange 22 of fitting 18. The fitting 18 and collar are anchored, as by bolt 24, to the cover 26 of gear housing 28. Clampingly engaged between flange 22 and the gear housing cover 26 is a compartment wall 30 which forms no part of the present invention.

The fitting 18 has a seat for a thrust bearing 32 which supports the lower drive section 34 of tubular screw 36. This screw has helical threads or flights 38 bearing against, or operating in immediate proximity to, the inner periphery of the sleeve 6 which forms the freezing chamber 4. Plural flights (two being shown) tend to balance radial stresses. Unbalanced stresses are quite substantial when a single thread or flight is used. The flights 38 scrape from wall 6 the ice frozen in this chamber and eject it through a compacting throat 100. The thrust bearing 32 absorbs the reaction pressure. Collar 40 encircles the reduced lower extremity 34 of the screw and seats on the cushion seal member 42 which engages the upper end of the annular closure fitting 18 which serves as a bottom closure for freezing chamber 4 and tends to exclude water from the thrust bearing 32.

Below the thrust bearing there is another seal at 44 to exclude leakage from the radial bearing 46 that is mounted in the fitting 18 and encircles the drive shaft 48 to which the screw is axially removably splined or keyed. Any leakage between the seal 42 and the seal 44 is carried off by means of a drain tube 50.

A suggested but non-critical drive is as follows:
Motor 52 drives pulley 54 by means of belt 56. Pulley 54 is mounted on a shaft which carries pinion 60 meshing with gear 62 on a jack shaft 64. Pinion 66 on the jack shaft meshes with gear 68 on the shaft 48 that drives the ice ejecting screw 36. As shown, there are appropriate bearings in the gear box 28 for the several shafts.

The upper end of the screw 36 has a radial bearing 37 provided with a suitable seat in the ring portion 122 of top closure 132 at the upper end of the device. As shown in FIG. 3, the inner surface 117 of the portion 116 is spiral about the screw axis so that the throat 100 progressively enlarges radially in the direction of rotation of the screw 36, such direction being indicated by the arrow 118 in FIG. 3.

The top of throat 100 is downwardly concave, being formed by converging surfaces 117 and 121. The surface 117 is curved inwardly at 119 as shown in FIG. 1 to overlie the generally radial flanges 120 which are carried by the uper end of screw 36. The under surface 121 of ring portion 122 of the top closure 132 curves outwardly over the flanges 120 into registry with the arcuately curved portions 119 of the surface 117 (FIG. 1).

Oil and moisture seals are provided at 124 between the upper end of screw 36 and the annular portion 122 of the top closure 132. These seals are directly below the radial bearing 37.

The progressive spiral enlargement of chamber 100 leads to a discharge spout 125 opening from the front of the device as shown in FIGS. 2 and 3.

Water to be frozen is supplied through pipe 70 subject to the control of a normally open valve 72. The valve stem 74 is operated in a closing direction by a lever 76 pivoted at 78 to an arm 80 connected with the valve. The channel 82 guides water admitted through valve 72 into a hopper 84 which is carried on a closure 132. A bracket 86 supports the valve from top closure member 132. The float rod 88 of the float 90 is pivotally connected at 92 to the lever 76. The arrangement is such that the float closes valve 72 whenever the level of water within the tubular screw 36 reaches a predetermined level. The float 90 need not rotate with the screw but is designed to move upwardly and downwardly as required. The screw rotates around it.

Water admitted to the interior of the screw to a level determined by the float passes freely into the freezing chamber through one or more radial ports 94 with which the screw is provided. The water tends to freeze on the inner wall surface of the sleeve 6 which forms the freezing chamber.

As the water freezes, the ice is scraped from sleeve 6 and ejected from the freezing chamber by the flights 38 which cause the ice to move upwardly through the throat 100 at the top of the freezing chamber. It will be understood from the foregoing that the ice making operation is or may be continuous, make-up water being supplied through the interior of the hollow tubular screw 36 to replace such water as is removed in the form of ice. The resulting ice is delivered through the spout 125.

The fact that the incoming water is admitted through the interior of the tubular screw not only provides for the cooling of the make-up water but also enables the water to give off heat to the tubular screw, thereby tending to keep the screw 36 and its flight 38 above freezing temperature and preventing ice from accumulating thereon. An advantage of the arrangement consists in the fact that the float and its connections are not required to rotate, being disposed in the center of the tubular screw with no mechanical connection to the screw.

The fact that all of the driving mechanism is encased in a housing in which it can be properly lubricated is a desirable factor. This arrangement is made practicable by the disposition of the bearings and seals and the driving connection from shaft 48 to the reduced lower extremity 34 of the screw 36.

Provision is made by means of drain pipe 128 and valve 130 for withdrawing all water from the freezing chamber when desired for flushing or other purposes. Simply releasing the nuts 135 and removing the cover 132 makes it possible to lift the tubular screw bodily from the freezing chamber for cleaning or other attention.

I claim:

1. An ice making machine comprising a freezing chamber having a tubular wall, a tubular screw open at its center and having means mounting it for rotation in said chamber and having a thread adapted in the course of such rotation to remove from said chamber ice forming therein, means for driving the screw, means for introducing water into the interior of said tubular screw, said screw having port means for delivering into the chamber for freezing therein the water which is introduced into the cavity of the screw, the means for introducing water comprising a water supply line provided with a valve having means for discharge of water into the screw, and a float having motion transmitting connection with the valve and disposed within the tubular screw, the tubular screw having an opening at its top to receive the water, and the valve actuating connection extending through said opening.

2. An ice making machine comprising a base having driving gearing, a tube mounted on said base and extending upwardly therefrom, a sleeve about said tube and having means connecting its ends with said tube to provide a refrigerant chamber, said sleeve having inlet and outlet ducts communicating with said chamber, a helical partition between the said tube and said sleeve defining a refrigerant conduit between the inlet and outlet ducts, a tubular screw having resilient means supporting it yieldably from said base, a shaft mounted within the base in connection with said gearing and having sliding driving connection with said screw, said screw including flight means proximate the interior of the tube for scraping therefrom ice frozen to said tube by refrigerant confined between the tube and the sleeve, and means for introducing water into the tube to be frozen thereon for removal of the resulting ice by said screw.

3. An ice making machine according to claim 2 in which the means for introducing water into the tube comprises a water inlet opening into the top of the tubular screw, the screw having outlet port means for discharging the water from the tubular screw into said tube, a float within the tubular screw and means controlled by said float for delivering water into the tubular screw.

4. An ice making machine comprising a freezing chamber having a tubular wall, means for refrigerating said wall, a screw having bearings upon which it is rotatable in said chamber, said screw having flights proximate said wall and pitched upwardly for the upward delivery of ice freezing on said wall, said chamber having a top closure provided with an opening for the discharge of ice and further provided with a throat encircling the screw and communicating with said opening and adapted to receive ice propelled upwardly by the screw, said throat having an external wall progressively increasing in radius spirally about the axis of the screw in the direction in which the screw rotates from minimum radius at one side of the opening to maximum radius at the other side of said opening, whereby ice delivered into the throat by the screw is discharged from said opening without jamming in said throat.

5. An ice making machine according to claim 4 in which said closure has a surface providing a top for said throat which is concave downwardly as viewed in radial section.

References Cited

UNITED STATES PATENTS

| | | | |
|---|---|---|---|
| 2,415,585 | 2/1947 | Genova | 62—354 X |
| 2,575,374 | 11/1951 | Walsh | 62—354 |
| 2,902,839 | 9/1959 | Marshall | 62—354 |
| 3,034,311 | 5/1962 | Nelson | 62—320 |
| 3,183,682 | 5/1965 | Conto | 62—298 |
| 3,245,225 | 4/1966 | Wallace | 62—320 |
| 3,276,223 | 10/1966 | Lunde | 62—320 |
| 3,296,817 | 1/1967 | Stoelting | 62—225 |
| 3,319,438 | 5/1967 | Kuebler et al. | 62—354 |

ROBERT A. O'LEARY, *Primary Examiner.*

W. E. WAYNER, *Assistant Examiner.*